United States Patent [19]

Tanaka

[11] Patent Number: 5,515,909
[45] Date of Patent: May 14, 1996

[54] FLOW SWITCHING APPARATUS, REGENERATIVE ALTERNATE COMBUSTION BURNER SYSTEM USING THE APPARATUS, AND REGENERATIVE HEAT EXCHANGER SYSTEM USING THE APPARATUS

[75] Inventor: Ryoichi Tanaka, Yokohama, Japan

[73] Assignee: Nippon Furnace Kogyo Kabushiki Kaisha, Kanagawa, Japan

[21] Appl. No.: 373,304

[22] PCT Filed: Jul. 22, 1993

[86] PCT No.: PCT/JP93/01023

§ 371 Date: Jan. 17, 1995

§ 102(e) Date: Jan. 17, 1995

[87] PCT Pub. No.: WO94/02784

PCT Pub. Date: Feb. 3, 1994

[30] Foreign Application Priority Data

Jul. 22, 1992 [JP] Japan .................... 4-216473

[51] Int. Cl.[6] .................................................. F23L 15/02
[52] U.S. Cl. ...................... 165/4; 165/10; 165/909; 432/181; 432/182
[58] Field of Search ............... 165/10, 9.4, 9.3, 165/9.1, 6, 4, 909; 34/86; 431/215; 432/181, 182; 126/91 A

[56] References Cited

U.S. PATENT DOCUMENTS

| | | | |
|---|---|---|---|
| 1,688,700 | 10/1928 | Gauss | 165/4 |
| 2,946,651 | 7/1960 | Houdry | 126/91 A |
| 3,368,327 | 2/1968 | Munters et al. | 165/4 X |
| 3,918,516 | 11/1975 | Carrasse et al. | 165/6 X |
| 3,977,466 | 8/1976 | Johansson | 165/40 |
| 3,990,503 | 11/1976 | Östbo | 165/9 |
| 4,348,818 | 9/1982 | Brown | 34/86 X |
| 4,497,361 | 2/1985 | Hajicek | 165/10 X |
| 4,870,947 | 10/1989 | Kawamoto | 126/91 A |
| 4,943,231 | 7/1990 | Jenkins et al. | 432/182 X |

FOREIGN PATENT DOCUMENTS

| | | |
|---|---|---|
| 51-6375 | 1/1976 | Japan . |
| 62-908 | 8/1987 | Japan . |
| 1219412 | 6/1989 | Japan . |
| 0254210 | 10/1990 | Japan ................ 126/91 A |

*Primary Examiner*—John Rivell
*Assistant Examiner*—Christopher Atkinson
*Attorney, Agent, or Firm*—Notaro & Michalos

[57] ABSTRACT

A flow switching apparatus has a simple structure and enables a rapid flow switching operation between two systems of flow, e.g., flows in which two kinds of fluid each having a temperature different from each other flows without causing any gas leakage. The apparatus comprises: a casing 18 partitioned by partition walls 5, 6 and 7 into four chambers among which two are defined as fixing chambers 2a and 2b connected to flows of two systems in which the flow directions of fluid are fixed and the remaining two are defined as switching chambers 4c and 4d connected to two systems of flow in which the flow directions of fluid are alternately switched. Communicating holes 8ac 8bc 8ad and 8bd are formed in the partition wall 7 and communicate each of the fixing chambers 2a and 2b with the switching chambers 4c and 4d. A switching member 3 connects one fixing chamber 2a to one switching chamber 4d and the other fixing chamber 2b to the other switching chamber 4c by opening and closing the communicating holes 8ac, 8bc, 8ad and 8bd.

8 Claims, 6 Drawing Sheets

FLOW SWITCHING APPARATUS, REGENERATIVE ALTERNATE COMBUSTION BURNER SYSTEM USING THE APPARATUS, AND REGENERATIVE HEAT EXCHANGER SYSTEM USING THE APPARATUS

FIELD OF THE INVENTION

The present invention relates to a flow switching apparatus preferable for switching two gas flow systems, a regenerative heat exchanger system and a regenerative alternate combustion burner system both using the apparatus. More particularly, the present invention relates to: a flow switching apparatus for switching two flow systems, e.g., one flow in which the high temperature gas flows and another flow in which the low temperature gas flows; a regenerative heat exchanger system such as an waste heat recovery system or a regenerative heat exchanger for alternately flowing two types of fluid each having a different temperature through a regenerator to effect heat exchange; and a regenerative alternate combustion burner system using the apparatus.

BACKGROUND OF THE INVENTION

Figure 8:
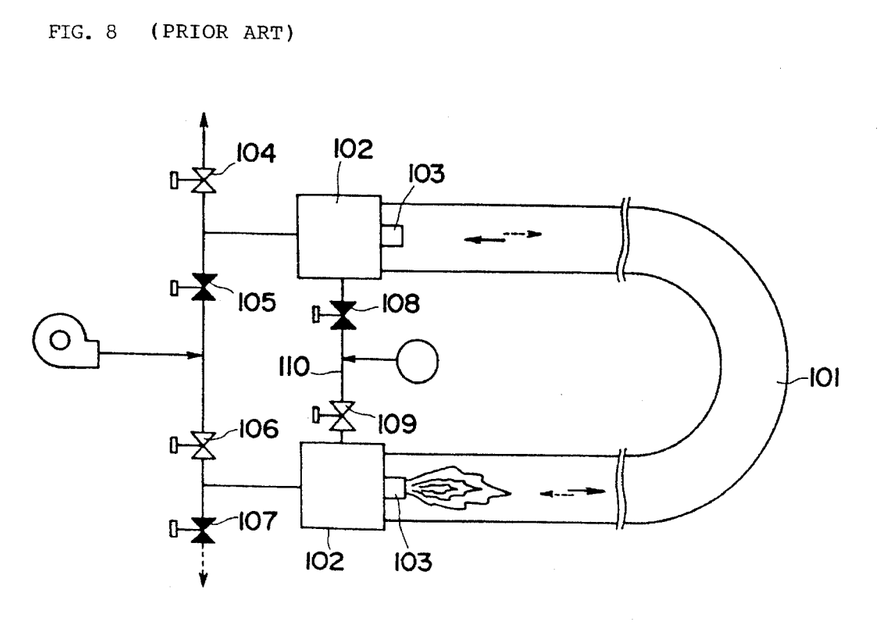
FIG. 8 is a schematic representation showing an example of a regenerative radiant tube burner in which a prior art electromagnetic directional control valve is incorporated.

The technique for recovering the considerable quantity of heat from the exhaust gas by using a regenerator to preheat the air for combustion has been recently developed. For example, a radiant tube burner having the configuration such as shown in FIG. 8 is proposed. In this burner, two burners 103 each having a regenerator 102 are fixed at both ends of a radiant tube 101, and combustion is alternately performed at the two burners 103. When combustion is effected at one burner 103, the produced combustion gas is exhausted through the regenerator 102 provided at the other burner 103 where no burning is made for preheating the air for combustion by using the heat of the combustion gas accumulated in the regenerator 102.

In such a regenerative alternate combustion burner system, the regenerator requires a flow switching apparatus for switching a flow through which the high temperature exhaust gas flows to another flow through which the low temperature air for combustion flows, and vice versa. Conventionally, a solenoid valve has been generally adopted as such a flow switching apparatus in the combustion system. For example, as shown in FIG. 8, the prior art apparatus has a configuration in which the solenoid valves 104, 105, 106 and 107 are provided at four positions and are selectively opened or closed to switch the flows for two kinds of gas having high and low temperatures. In the drawing, reference numerals 108 and 109 designate the solenoid valves for selectively opening or closing a fuel supply system 110.

The flow switching apparatus having the solenoid valves therein however requires a plurality of expensive solenoid valves, thus increasing the production cost. In particular, application of the apparatus to a heat exchanger in the combustion system also requires a number of more expensive solenoid valves for high temperature, then the production cost increases. Further, since the size of the solenoid valve for the air piping is considerably large and these four valves must be used in the system, they take up the large space and the double piping arrangement is needed, complicating the configuration. For instance, when such an apparatus is applied in a furnace or a soaking pit in an ironworks, thousands of solenoid valves are required in the apparatus. Moreover, the frequent switching operations between the air flow and the exhaust gas flow in a short period like one minute or less may result in deterioration of the durability of the solenoid valves.

Figure 9:
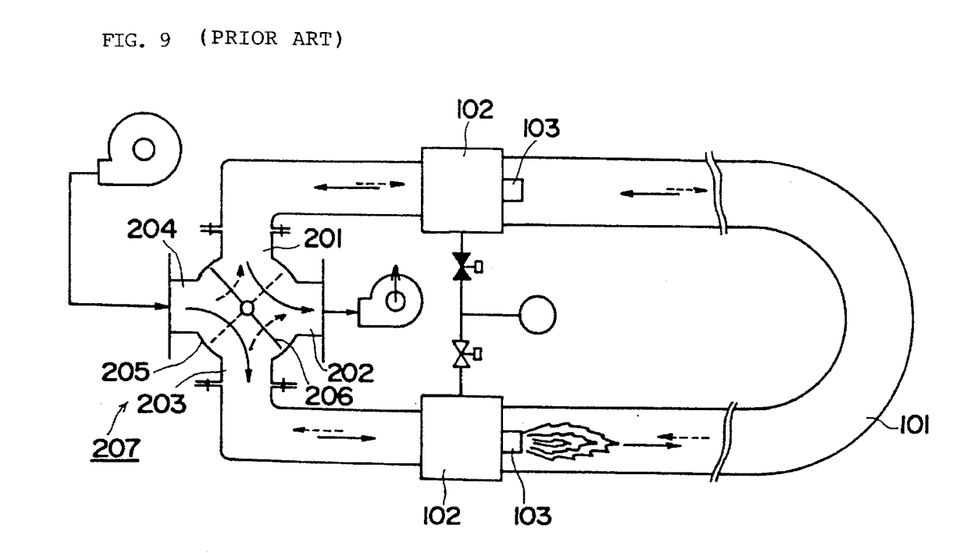
FIG. 9 is a schematic representation showing a regenerative radiant tube burner which a conventional four-way valve is incorporated.

In addition, the use of a four-way valve 207 shown in FIG. 9 may be also possible. The four-way valve 207 uses a directional control valve stem 206 which swivels in a valve casing 205 having four ports 201, 202, 203 and 204 in order to communicate any two adjacent ports with each other to switch the flows.

However, this four-way valve alternately leads the two types of gas each having a temperature greatly different from each other into the system. Any clearance must therefore be set between the directional control valve stem 206 and a main frame 205 of the valve to avoid the action failure due to the thermal expansion, and the short pass which may occur to the two flows in the valve in apt to lead to the gas leakage. For example, when using this valve in the illustrated regenerative radiant tube burner, since the air for combustion continuously leaks to the exhaust gas flow in the four-way valve 207 and the amount of leakage is inconstant and uncertain, there is a drawback that the air ratio in the combustion can not be securely controlled. Further, since the dimension of the four-way valve can not be increased, the use of this valve to the flows having a large capacity is not preferable.

Figure 10:
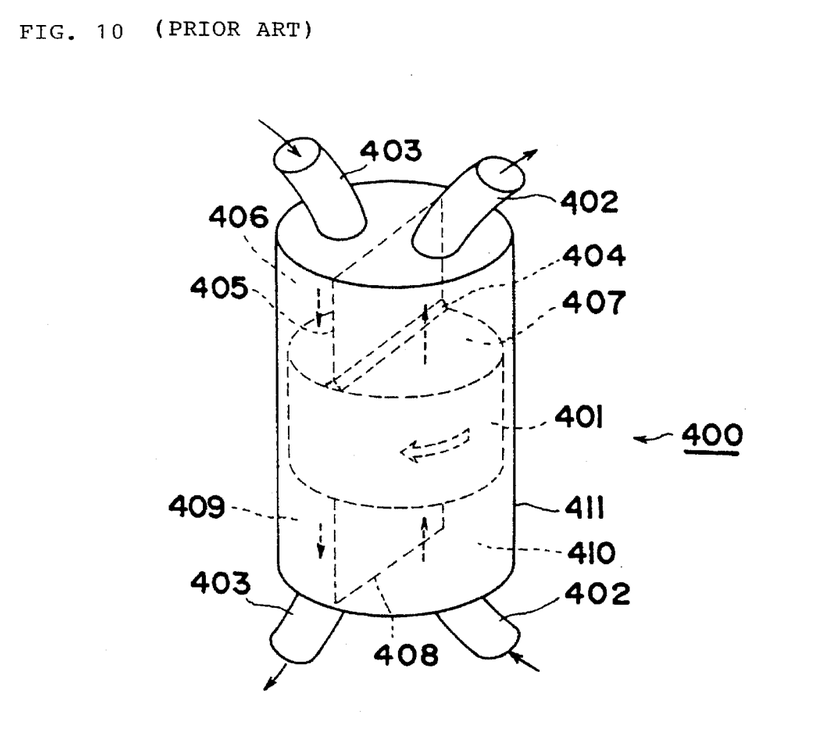
FIG. 10 is a schematic representation showing an example of the Ljungström type air preheater which is a conventional heat exchanger for waste heat recovery.

As a conventional heat exchanger system for effecting heat exchange between two fluid systems via the regenerator, the Ljungström type air preheater shown in FIG. 10 is generatlly used. In the Ljungström type air preheater 400, two flows 402 through which the relatively high temperature gas such as the exhaust gas flows and two flows 403 through which the relatively low temperature gas such as the air for combustion flow are fixed to a casing 411. The rotation of a disc type regenerator 401 enables switching of the gas flows to the regenerator 401 without changing over the flow itself, and the air for combustion is preheated by using the heat recovered from the exhaust gas. In this Ljungström type air preheater 400, the upper and lower parts of the rotatable generator 401 are respectively divided into at least two chambers 406 and 407 and other two chambers 409 and 410 by partition walls 405 and 408 and a sealing material 404. Since the regenerator 401 is substantially divided into two areas by the sealing material 404, the regenerator 401 is heated by the exhaust gas in one area while the air for combustion is preheated in the other area.

When using the Ljungström type air preheater, however, the gas leaks from the high pressure (the low temperature gas) side to the low pressure (the high temperature gas) side. Although various means are adopted to the sealing in order to avoid this leakage, the sealing effect can not be obtained on the high temperature side before heat exchange, being impossible to suppress the leakage. About 25% of the air for combustion therefore leaks to the exhaust gas flow and the quantity of the leakage is inconstant. Hence there arises a problem that the air ratio can not be precisely controlled when directly using the preheated air to the combustion system. In addition, when employing the large regenerator, the rotational mechanism may have a enlarged structure or the strength of the regenerator may be unreliable due to the heavy weight of the regenerator.

DISCLOSURE OF THE INVENTION

In view of the above-described problems in the prior art, an object of the present invention is to provide a flow switching apparatus which has a simple structure and can perform the flow switching operation at a high speed without causing any gas leakage between two flow systems through which two kinds of gas, e.g., each having a different temperature flows.

To achieve this aim, the present invention provides a flow switching apparatus comprising: a casing divided by partition walls into four chambers which are two fixing chambers connected with two flow systems through which each fluid flows in a fixed direction and are two switching chambers connected with two flow systems in which the flow directions of the fluid are alternately switched, and the casing being arranged in such a manner that the two switching chambers are respectively adjacent to each of the two fixing chambers; communicating holes drilled in the partition wall for communicating each of the fixing chambers with the two switching chambers; and a switching means for communicating one of the fixing chambers with one of the switching chambers and the other fixing chamber with the other switching chamber by opening and closing the communicating holes; the flow switching apparatus having such a structure that the two fixing chambers alternately communicate with either of the switching chambers respectively.

Further, the present invention provides a flow switching apparatus comprising: a casing which is constituted by a fixing chamber member divided into two fixing chambers by a partition wall and a switching chamber member divided into two switching chambers by a partition wall arranged orthogonal to the partition wall of the fixing chamber member and which partitions the fixing chamber member and the switching chamber member along a flow direction; communicating holes which are drilled in the partition wall of the casing in a flow direction and which communicates one fixing chamber with two switching chambers and the other fixing chamber with the two switching chambers at an area where these chambers overlap on each other; and a switching means for communicating one fixing chamber with one of the two switching chambers while the other fixing chamber with the other switching chamber. In this apparatus, the switching means is preferably butterfly type dampers each of which alternately closes two communicating holes provided in the same chamber or a rotatable disc having through holes provided at intervals of 180 degrees which alternately opens two communicating holes arranged in the same chamber.

Furthermore, the present invention provides a flow switching apparatus comprising: a casing which is divided by an X-shaped partition wall into four chambers among which two chambers opposed to each other are fixing chambers connected to two flow systems through which the fluid flows in a fixed direction while other two chambers opposed to each other are switching chambers connected to two flow systems in which the flow directions of the fluid are alternately switched; and a switching means which provides communicating holes for communicating two adjacent chambers with each other in the partition wall and which is dampers for being brought into contact with the partition wall at a position close to an intersection point of the partition wall to block the communicating holes; enabling switching of the switching chambers connected to each of the fixing chambers by swinging action of the switching means.

Moreover, the present invention provides a flow switching apparatus comprising: a casing which has two Y-shaped partition walls arranged to be opposed to each other therein, one of the Y-shaped partition walls forming three chambers and one out of these three chambers being divided by part of the other Y-shaped partition wall to form four chambers in the casing; communicating holes for communicating two adjacent chambers formed by the partition walls with each other, assuming that two of the four chambers respectively formed by the two Y-shaped partition walls arranged to be opposed to each other are fixing chambers connected to two flow systems in which the flow directions of the fluid are fixed while other two chambers formed by the partition walls are switching chambers in which the flow directions of the fluid are alternately switched; and a switching means constituted by dampers which are provided at a position close to the intersection point of the partition walls and are brought into contact with the partition walls to block the communicating holes; enabling switching of the switching chambers connected to each of the fixing chambers by swinging action of the switching means.

According to above-described flow switching apparatus of the present invention, since a first fixing chamber of the fixing chamber member is connected to one switching chamber of the switching chamber member at the same time when the other switching chamber is connected to a second fixing chamber, one opening/closing operation of the switching means enables secure and rapid switching of the two flow systems, for example, the two flows in which two kinds of gas each having a different temperature flow without causing any leakage of the gas. In particular, when using a mechanism employing the butterfly type switching means, since the flow switching operation is performed under the intake pressure and the exhaust pressure, the shutdown can be accomplished in an instant, thereby reducing the possibility of the gas leakage at the switching operation. Further, according to the flow switching apparatus of the present invention, one driving device (the switching means) opens and closes four communicating holes, thus it is possible to realize the switching means whose structure is more compact as compared with the prior art means.

Another object of the present invention is to provide a flow switching apparatus for use in a regenerative alternate combustion burner system which is more compact and inexpensive than a solenoid valve and prevents the air for combustion and the exhaust gas from leaking.

To this end, according to a regenerative alternate combustion burner system of the present invention, an air system for combustion is connected to one of two fixing chambers of a fixing chamber member while an exhaust gas system is connected to the other of the same in the above-described flow switching apparatus, each regenerator is connected to two switching chambers of a switching chamber member and also each alternate combustion type burners for supplying and emitting the air for combustion and the combustion gas via the regenerator is connected to the two switching chambers of the same, in order to alternately perform combustion at the burners by using the air for combustion supplied through the flow switching apparatus and to emit the combustion gas from one burner where no combustion is made via the flow switching apparatus.

In this regenerative alternate combustion burner system, since the switching means can be mechanically switched, it is possible to securely realize the switching cycle between the air for combustion and the exhaust gas at a high speed of tens seconds and reduce the production cost as compared with the prior art using a solenoid valve, thereby stably using this system for a long time. Further, although two air pipings and two exhaust pipings are required for a pair of regenerative burners in the prior art regenerative burner system, the present invention provides the very simple piping arrangement in which only one air piping and one exhaust piping are used and it does not involve any fluid leakage.

Moreover, a further object of the present invention is to provide a regenerative heat exchanger system which can effect heat exchange by flowing two kinds of fluid each having a different temperature therethrough without switching two flows.

To achieve this aim, according to a regenerative heat exchanger system of the present invention, the above-described flow switching apparatus is provided to the upstream and downstream sides of the regenerator respectively, and the flow of the fluid which has changed in the flow switching apparatus on the upstream side is recovered in the flow switching apparatus on the downstream side after being passed through the regenerator to perform flow switching within the regenerator.

In this regenerative heat exchanger system, it is not necessary t rotate the regenerator, thus there occur fewer problems such as damages of the regenerator and sealing process is simplified, reducing the possibility of the fluid leakage.

BEST FORMS EMBODYING THE INVENTION

The configuration of the present invention will now be described hereinbelow in detail on the basis of embodiments illustrated in the accompanying drawings.

Figure 1:
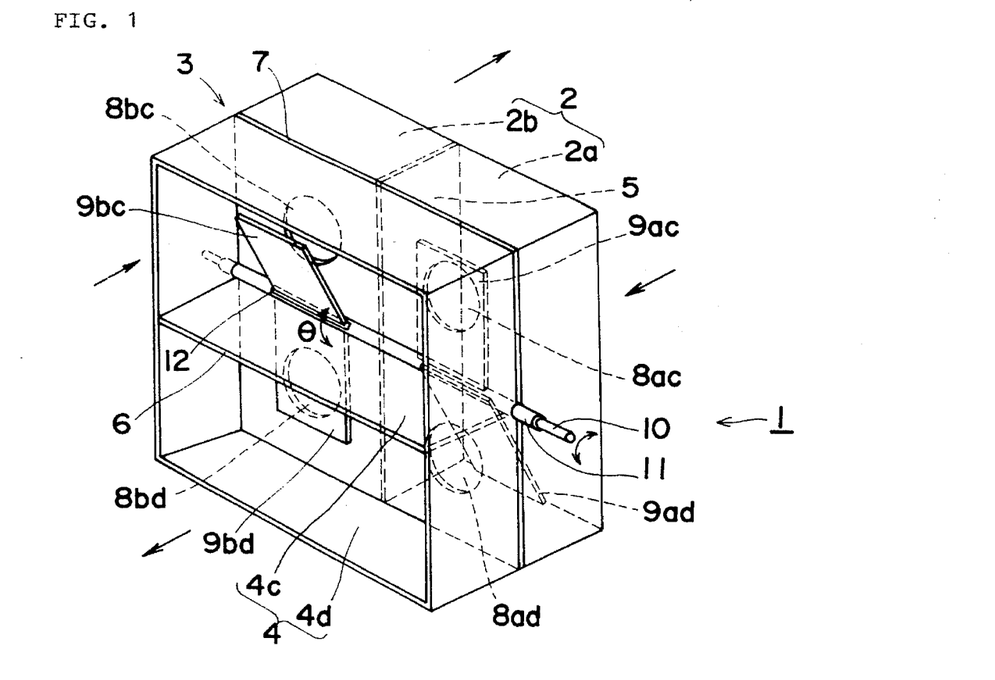
FIG. 1 is a perspective view showing an embodiment of a flow switching apparatus according to the present invention.

FIG. 1 shows an embodiment of a flow switching apparatus according to the present invention. This embodiment is provided with butterfly type valves as a switching means.

This flow switching apparatus 1, which switches the directions of fluid flowing in two systems of flow different from each other, is constituted by a fixing chamber member 2, a switching chamber member 4, and a switching means 3 for selectively changing over portions which open or close and partition the fixing chamber member 2 and the switching chamber member 4.

In this embodiment, the fixing chamber member 2 is divided to a first fixing chamber 2a connected to one flow system and a second fixing chamber 2b connected to the other flow system by, e.g., a vertical partition wall 5. Meanwhile, the switching chamber member 4 is divided to a first switching chamber 4c and a second switching chamber 4d by a horizontal partition wall 6 provided orthogonal to the partition wall 5 of the fixing chamber member 2. These fixing chamber member 2 and switching chamber member 4 are partitioned along the flow direction of the fluid by means of a partition wall 7. Therefore, the fixing chamber member 2 and the switching chamber member 4 are substantially partitioned into a ⊞-shaped four chambers 2a, 2b, 4c and 4d each marked off at an angle of 90 degrees in such a manner that the first and second switching chambers 4c and 4d of the switching chamber member 4 overlap on the first fixing chamber 2a of the fixing chamber member 2 and the first and the second switching chambers 4c and 4d of the switching chamber member 4 overlap on the switching fixing chamber 2b of the fixing chamber member 2. Reference numeral 18 designates a casing in the drawing.

In this example, the switching means 3 for selectively communicating the first and second fixing chambers 2a and 2b of the fixing chamber member 2 with the first and second switching chambers 4c and 4d of the switching chamber member 4 is constituted by: butterfly type dampers (plates) 9ac, 9bc, 9ad and 9bd which selectively open and close four communicating holes 8ac, 8bc, 8ad, and 8bd drilled in the partition wall 7 which partitions the fixing chamber member 2 and the switching chamber member 4 along the flow direction; and a driving mechanism for driving these dampers 9ac, 9bc, 9ad and 9bd to open and close the holes. Although the driving mechanism is not restricted to the certain type, it is constituted by a switching shaft 10, a non-illustrated actuator for rotating the shaft 10 and others in the present embodiment. The switching shaft 10 is accommodated in a rotatable manner in a cylindrical shaft holder 11 provided at an intersection point of the partition wall 7 and the partition wall 6. To this shaft holder 11 is formed a window 12 having an angle slightly larger than the swinging range of the dampers 9ac, 9bc, 9ad and 9bd, and each of the dampers 9ac, 9bc, 9ad and 9bd is fixed by means of welding or the like to the switching shaft 10 so as to pierce into the window 12.

Further, the dampers 9bc and 9bd are provided in the first switching chamber 4c and the second switching chamber 4d of the switching chamber member 4 while the dampers 9ac and 9ad are provided in the first fixing chamber 2a of the fixing chamber member 2, in the embodiment. The two pairs of dampers 9ac, 9ad and 9bc, 9bd are respectively fixed so as to form an open angle θ of about 150 to 90 degrees between two dampers constituting each pair to the switching shaft 10 provided at the intersection point of the two partition walls 7 and 6. This embodiment adopts the butterfly type configuration in which each pair of dampers 9ac, 9ad and 9bc, 9bd intersect at the open angle θ of 150 degrees. Accordingly, when the communicating holes, e.g., 8ac and 8bd on one side are closed by the dampers 9ac and 9bd, the dampers 9ad and 9bc which close the communicating holes 8ad and 8bc on the other side are placed bias toward the partition wall 7 with an angle of 30 degrees between wall 7 and each damper 9ad or 9bc, thus opening the communicating holes 8ad and 8bc. Since each damper 9ac, 9bc, 9ad or 9bd is provided on the upstream side of the fluid flowing through each communicating hole 8ac, 8bc, 8ad or 8bd of the partition wall 7, they close the communicating holes 8ac, 8bc, 8ad and 8bd under the pressure of the fluid, respectively. Further, since the pressure of the fluid is given to the damper on the opposite side in the same way, this pressure functions as a counter weight at the switching operation. Therefore, the dampers can be smoothly and rapidly switched by the relatively light force. Although not illustrated, it is preferable to provide the sealing material to the edge of the dampers 9ac, 9bc, 9ad and 9bd or the communicating holes 8ac, 8bc, 8ad and 8bd to enhance the gastightness.

The thus-configured flow switching apparatus 1 operates in the following manner. The description of this operation is given as to the apparatus in which the supply system and the exhaust system having the flow directions of the fluid opposite to each other are the two systems of flow whose flow directions are fixed.

Firstly, referring to FIG. 1, when the fluid having the relatively low temperature, e.g., the air for combustion is supplied to the first fixing chamber 2a of the fixing chamber member 2, this air for combustion is then fed to the second switching chamber 4d of the switching chamber member 4 via the communicating hole 8ad. Subsequently, this air is supplied to the portion requiring the air such as a regenerator or a burner through the flow connected to the second switching chamber 4d. Meanwhile, the fluid fed to the first switching chamber 4c of the switching chamber member 4, for example, the exhaust gas having passed through the regenerator flows into the fixing chamber 2b of the fixing chamber member 2 through the communicating hole 8bc. The combustion gas is then emitted in the atmosphere via the flow, e.g., the exhaust flow connected to the fixing chamber 2b.

When the switching shaft 10 is then rotated clockwise from the state shown in FIG. 1, the dampers 9ad and 9bc block the communicating holes 8ad and 8bc and simultaneously open the communicating holes 8ac and 8bd. The air for combustion to be led to the first fixing chamber 2a of the fixing chamber member 2 then flows from the upper communicating hole 8ac of the first fixing chamber 2a to the first switching chamber 4c of the switching chamber member 4 to be supplied to the flow connected to this chamber 4c. At this time, since the regenerator provided to this flow has already heated by the waste heat of the exhaust gas which has passed therethrough before switching, the air for combustion to be fed is given the heat of the regenerator and preheated. On the other hand, the exhaust gas flows from the second switching chamber 4d of the switching chamber member 4 to the second fixing chamber 2b of the fixing chamber member 2 through the lower communicating hole 8bd. At this time, the damper 9ad closes the other communicating hole 8ad leading to the second switching chamber 4d. The exhaust gas loses its waste heat in the regenerator of the flow connected to the second switching chamber 4d to become the relatively low temperature gas, and is then emitted.

Figure 2:
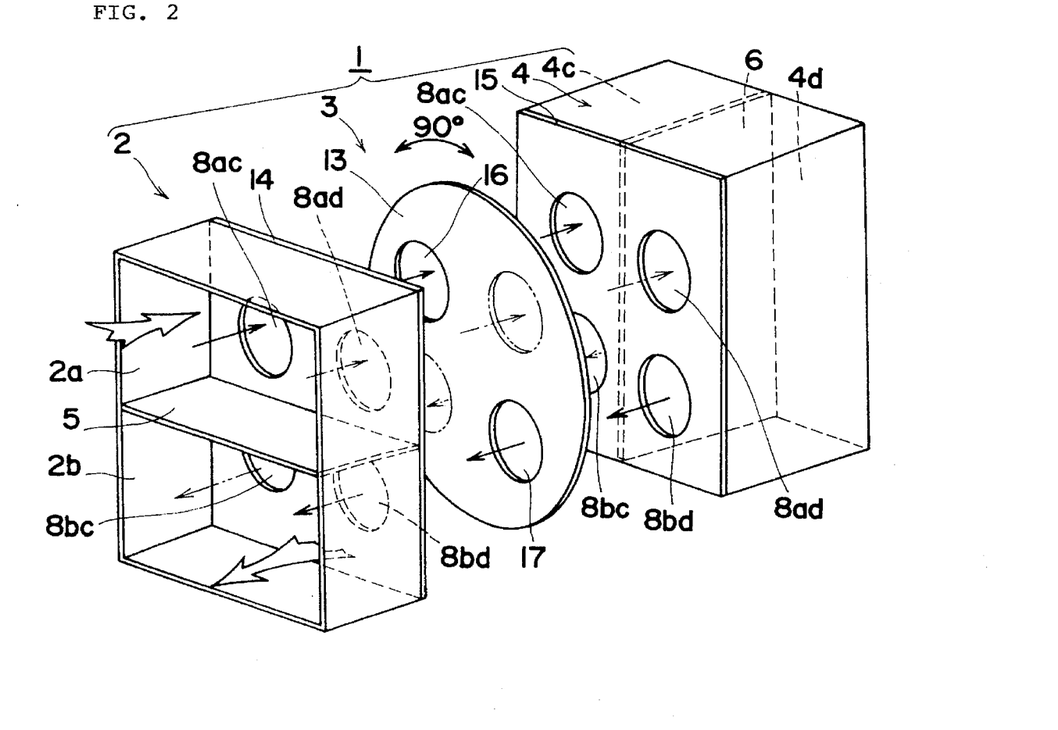
FIG. 2 is a perspective view showing another embodiment of a flow switching apparatus according to the present invention.

FIG. 2 shows another embodiment of the present invention. The flow switching apparatus of this embodiment uses a rotatable plate 13 which rotates or swings within an angle of 90 degrees as the switching means 3. In this embodiment, the arrangement of the fixing chamber member 2 and the switching chamber member 4 is opposite to that of the embodiment shown in FIG. 1. As shown in FIG. 2, a fixing chamber member 2 and a switching chamber member 4 are partitioned along the flow direction by partition walls 14 and 15 arranged orthogonal to flows, and four communicating holes 8ac, 8bc, 8ad and 8bd provided to four chambers 2a, 2b, 4c, and 4d partitioned by partition walls 5 and 6 disposed along the flow direction are opened respectively. A rotatable disc 13 is provided between the partition wall 14 of the fixing chamber member 2 and the partition wall 15 of the switching chamber member 4. In the rotatable disc 13, two communicating holes 16 and 17 are formed at the positions corresponding to those of two out of four communicating holes 8ac, 8bc, 8ad and 8bd formed to the fixing chamber member 2 and the switching chamber member 4. These two communicating holes 16 and 17 are formed at interval of 180 degrees and provided at positions where these two holes can simultaneously communicate with the first fixing chamber 2a and the second fixing chamber 2b of the fixing chamber member 2 and the first switching chamber 4c and the second switching chamber 4d of the switching chamber member 4. Although not illustrated, it is preferable to use the sealing material between the partition wall 14 and the rotatable disc 13 and between the rotatable disc 13 and the partition wall 15 to hermetically seal gaps between these portions and to alternately partition the communicating holes 8ac, 8bc, 8ad and 8bd. For example, the sliding type sealant may be used on the partition walls 14 and 15 so as to form closely-stuck four squares and partition each communicating holes 8ac, 8bc, 8ad and 8bd, or may be provided so as to form the X shape on both surfaces of the rotatable disc 13. Further, although not shown, a rotary driving shaft may be disposed in the center of rotatable disc 13 to enable the swinging or rotating action. In addition, when the gear is formed to the periphery of the rotatable disc 13, the disc 13 can rotate by driving a pinion gear which meshes with the peripheral gear by an actuator such as a motor, or the disc 13 can also rotate by pressing a roller or the like against the periphery of the disc 13.

When the communicating holes 16 and 17 are disposed as shown by the solid line in FIG. 2, one of two communicating holes 8ac and 8ad drilled in the first fixing chamber 2a of the fixing chamber member 2, i.e., the hole 8ac therefore communicates with the communicating hole 16 of the rotatable disc 13 and at the same time with the communicating hole 8ac provided to the first switching chamber 4c of the switching chamber member 4. Meanwhile, one of two communicating holes 8bc and 8bd formed to the second fixing chamber 2b of the fixing chamber member 2, namely, the hole 8bd overlaps on the communicating hole 17 of the rotatable disc 13 and simultaneously overlaps on the lower communicating hole 8bd formed on the second switching chamber 4d of the switching chamber member 4 to communicate the second switching chamber 4d of the switching chamber member 4 with the second fixing chamber 2b of the fixing chamber member 2. At this time, the communicating hole 8ad connected to the first fixing chamber 2a and the second switching chamber 4d and the communicating hole 8bc of the second fixing chamber 2b and the first switching chamber 4c are respectively partitioned and blocked by the rotatable disc 13. When the rotatable disc 13 rotates 90 degrees, the communicating holes 16 and 17 move to the positions designated by the broken line in FIG. 2 and the first fixing chamber 2a communicates with the second switching chamber 4d while the second fixing chamber 2b communicates with the first switching chamber 4c respectively, thereby switching the flow.

Figure 3:
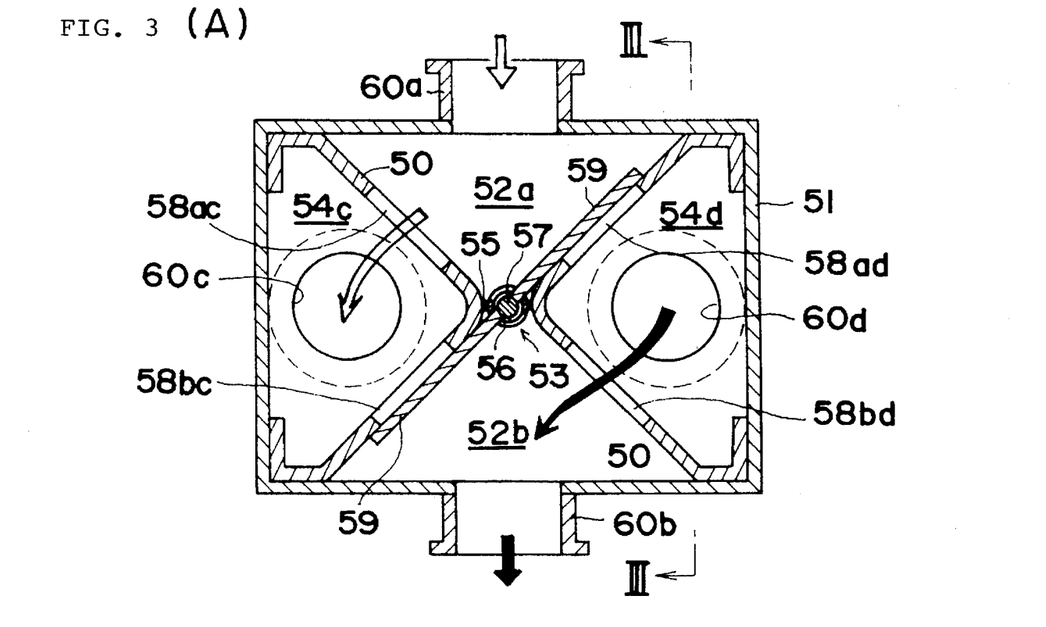
FIG. 3(A) is a longitudinal sectional view showing an embodiment of a flow switching apparatus having an X-shaped partition wall according to the present invention.
FIG. 3(B) is a sectional view taken along the III—III line in FIG. 3(A)

FIG. 3 shows a further embodiment. In this embodiment, the partition walls 5, 6 and 7 of the flow switching apparatus shown in FIG. 1 are converted into an X-shaped butterfly type damper for switching flows. An X-shaped partition wall 50 partitions the inside of a casing 51 into four chambers. In other words, the inside of the casing 51 is first partitioned by the X-shaped partition wall 50 into four chambers. Then, assuming that two chambers opposed to each other among the four chambers, e.g., 52a and 52b are the first and second fixing chambers connected to the two flow systems in which the flow directions of the fluid are fixed, the remaining two chambers opposed to each other can be the first and second switching chambers 54c and 54d connected to the two flow systems in which the flow directions of the fluid are alternately switched. To each plane of the X-shaped partition wall 50 are drilled communicating holes 58ac, 58bc, 58bd and 58ad for mutually connecting two adjacent chambers: 52a and 54c; 52a and 54d; 52b and 54c; and 52b and 54d and four chambers 52a, 52b, 54c and 54d are mutually communicating. To the intersection point of the X-shaped partition wall 50 is provided a switching means 53 constituted by dampers 59 which are brought into contact with the partition wall 50 to block the communicating holes 58ac, 58bc, 58bd and 58ad. This switching means 53 is constituted by a butterfly type damper which simultaneously switches the connections between the fixing chambers 52a and 52b and the switching chambers 54c and 54d by swiveling the dampers 59 positioned within the first and second fixing chambers 52a and 52b around the same rotary shaft 57 in the same direction or by simultaneous closing one of two communicating holes 58ac or 58ad and one of two communicating holes 58bd or 58bc. The rotary shaft 57 for supporting and rotating the dampers 59 is supported in a rotatable manner by a bearing 56 at a position close to the intersection point of the X-shaped partition wall 50. Further, to a position near the intersection point of the X-shaped partition wall 50 is provided a partition 55 for partitioning two chambers opposed to each other, i.e., the first fixing chamber 52a and the second fixing chamber 52b in this embodiment. This partition 55 consists of a plate type sealant which protrudes from the X-shaped partition wall 50 toward the center of the rotary shaft 57 so as not to prevent the rotary shaft 57 and the dampers 59 from swiveling. The rotary shaft 57 is provided with the damper 59 occupying the first fixing chamber 52a and the damper 59 occupying the second fixing chamber 52b. These dampers are positioned at interval of 180 degrees so as to be brought into contact with the partition wall 50 in parallel. Each of the communicating holes 58ac, 58ad, 58bd and 58bc is formed at a position where each hole can be completely closed at stroke ends of the damper 59. Further, connection pipes 60a, 60b, 60c and 60d for linking flow one by one are provided to the first and second fixing chambers 52a and 52b and the first and second switching chambers 54c and 54d. The first and second fixing chambers 52a and 52b are connected to the two flow systems in which the flow directions of the fluid are fixed, while the first and second switching chambers 54c and 54d are connected to the two flow systems in which the flow directions of the fluid are alternately switched. It is preferable to use the sealant to the edges of the damper 59 and the communicating holes 58ac, 58bd and 58bc to enhance the gastightness.

The thus-configured flow switching apparatus switches the flows in the following manner. The explanation of the operation is given as to the case that the supply system and the exhaust system in which the flow directions are opposite to each other are the two flow systems in which the flow directions are fixed. For example, the supply fluid, e.g., the air for combustion having a low temperature flows into the first fixing chamber 52a while the exhaust fluid, e.g., the exhaust gas having a high temperature flows into the second fixing chamber 52b. As shown in the drawing, the fluid led in the first fixing chamber 52a is fed into the first switching chamber 54c via the through hole 58ac of the partition wall 50 and further supplied to the portion requiring the air supply through the non-illustrated flow or the like connected to the chamber 54c. Meanwhile, the exhaust fluid is absorbed from the exhaust source or the like by the induced draft fan or the like of the exhaust system through the flow connected to the second switching chamber 54d. The exhaust fluid is further led to the second switching chamber 54d and subsequently passes through the second fixing chamber 52b through the communicating hole 58bd to be emitted to the flow of the exhaust system connected to the chamber 52b.

In the case of this flow switching apparatus, since two dampers 59 as the switching means 53 swivel by one rotary shaft 57, the structure of the apparatus becomes compact, thereby facilitating the operation. In addition, four chambers are efficiently arranged in one casing 50, reducing unnecessary use of the space.

Figure 4:
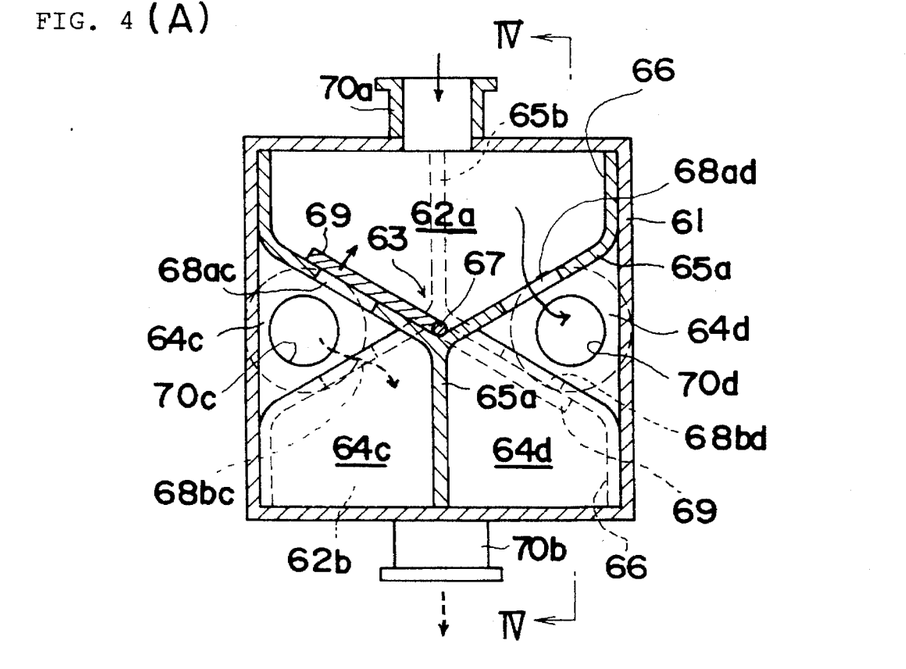
FIG. 4(A) is a longitudinal sectional view showing an embodiment of a flow switching apparatus having Y-shaped partition walls according to the present invention.
FIG. 4(B) is a sectional view taken along the IV—IV line in FIG. 4(A)

FIG. 4 shows a still further embodiment. The flow switching apparatus of this embodiment includes partition walls being a modification of the X-shaped partition wall shown in FIGS. 3. The apparatus shown in FIGS. 4 has a configuration in which two Y-shaped partition walls 65a and 65b are combined in the casing 61 to obtain the substantially same effect with that of the X-shaped partition wall while enhancing the sealing performance in each chamber. Namely, two Y-shaped partition walls 65a and 65b are aligned in the axial direction of the rotary shaft 67 of the switching means 63 and arranged to be opposed to each other, and one of three chambers divided by each Y-shaped partition wall 65a or 65b is further partitioned from the other Y-shaped partition wall by the partition wall 66. The four chambers are partitioned from each other in the casing 61. In this embodiment, since the upper triangular portion of the Y-shaped partition wall 65a and the lower triangular portion of the Y-shaped partition wall 65b are partitioned by the partition wall 66, the four chambers are formed in the casing 61. The remaining chambers which are not partitioned by the partition wall 66 constitute two chambers extending to two Y-shaped partition walls 65a and 65b, respectively. Two out of four chambers, i.e., the chambers 62a and 62b in this embodiment are used as the first and second fixing chambers connected to the two flow systems in which the flow directions of the fluid are fixed. On the other hand, the remaining two chambers, i.e., the chambers 64c and 64d in this embodiment are used as the first and second switching chambers connected to the two flow systems in which the flow directions of the fluid are alternately switched. The communicating holes 68ac, 68ad, 68bc and 68bd formed in the partition walls 65a and 65b make the communication between any two adjacent chambers among these four chambers 62a, 62b, 64c and 64d. A switching means 63 constituted by dampers 69 is provided at the intersection point of the Y-shaped partition walls 65a and 65b to alternately close the communicating holes 68ac, 68ad, 68ac and 68bd. The switching means 63 consists of dampers 69 for closing the communicating holes 68ac, 68ad, 68bc and 68bd and a rotary shaft 67 for supporting and rotating the dampers 69. The rotary shaft 67 is disposed at a position close to the intersection point of the Y-shaped partition walls 65a and 65b so as to pierce through the partition walls 66 each partitioning the Y-shaped partition walls 65a and 65b from each other in the longitudinal direction. The rotary shaft 67 is provided with two dampers 69 each placed in one chamber partitioned by the Y-shaped partition wall 65a or 65b, i.e., the first fixing chamber 62a or the second fixing chamber 62b in this embodiment. The sealant may be preferably provided to the edges of the dampers 69 and the communicating holes 68ac, 68bd and 68bc to enhance the airtightness.

The thus-configured flow switching apparatus switches the flows in the substantially same manner with that of the embodiment shown in FIG. 3, hence omitting the explanation of the operation. In the case of the flow switching apparatus shown in FIG. 4, the four chambers are completely partitioned in the casing 61 by the two Y-shaped partition walls 65a and 65b and the vertical partition walls 66, thereby further reducing possibilities of the gas leakage which may occur between two flows in the casing as compared with the embodiment shown in FIG. 3.

Figure 5:
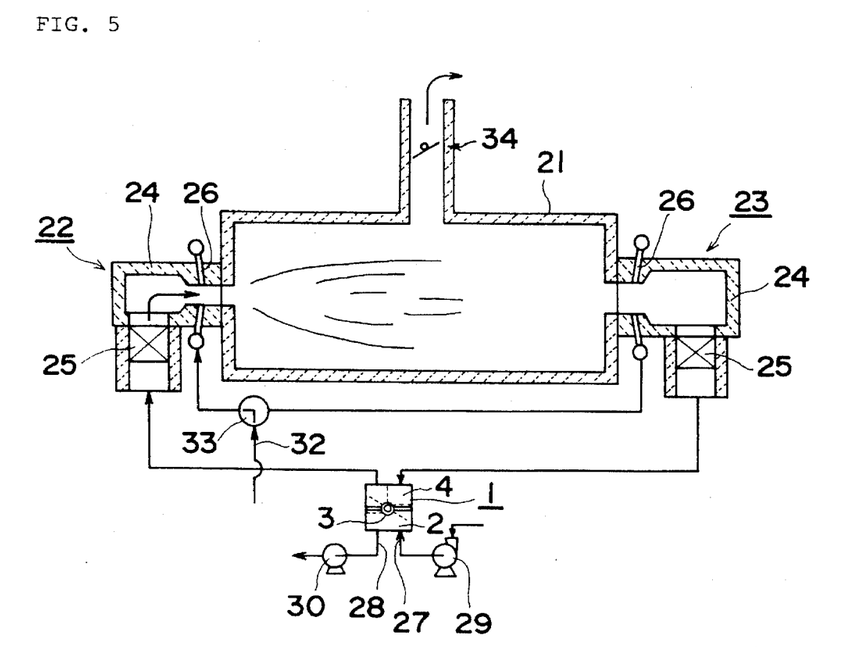
FIG. 5 is a schematic representation showing an example of a regenerative alternate combustion system to which a flow switching apparatus to the present invention is applied.

The flow switching apparatus having such a structure may be utilized as follows. Referring to FIG. 5, the description will now be given as to an example of the regenerative alternate combustion system in which the apparatus is applied to a burner that performs combustion in a furnace. It is needless to say that the apparatus can be also applied to a burner effecting combustion in a radiant tube.

This combustion system has a furnace body 21 including at least a pair of regenerative burners 22 and 23. Although the structure and the combustion method of the regenerative burners 22 and 23 are not restricted to any specific type, an air system 27 for combustion for supplying the air for combustion and an exhaust gas system 28 for emitting the combustion gas can be selectively connected to a regenerator 25 and a windbox 24 through a flow switching apparatus 1 to supply or emit the air for combustion or the exhaust gas via the regenerator 25 in this embodiment. A ceramic product or the like having a honeycomb construction in which a plurality of through holes (cells) are provided in the longitudinal direction is used as the regenerator 25. Further, each of two fuel nozzles 26 for jetting the fuel is embeded in a burner throat portion provided at a position close to the furnace body 21 in the windbox 24. The fuel nozzles 26 are provided to jet the fuel from the inner peripheral surface of the refractory material forming the burner throat, and they are set in such a manner that course of the fuel injection intersects the flow of the air for combustion in the burner throat. In addition, the exhaust gas system 28 and the air system for combustion 27 are selectively connected to the regenerator 25 and the windbox 24 of one of the burners 22 and 23 by means of the flow switching apparatus 1 of the present invention illustrated in FIG. 1 or 2. When the air for combustion is supplied to the windbox 24 by, for example, a forced draft fan 29, the combustion gas is simultaneously absorbed from the windbox 24 where no combustion is made by, for example, an induced draft fan 30 and emitted to the atmospheric air. Further, the fuel is selectively supplied to one of the burners 22 and 23 through a three-way valve 33 of the fuel supply system 32. In the drawing, a reference numeral 34 designates an exhaust means for adjusting the pressure in the furnace, and this means may be provided if necessary.

With such an arrangement, a pair of the regenerative burners 22 and 23 alternately make the combustion, and the combustion gas generated at that time is emitted through the exhaust gas system 28 of the burner where no combustion is made. The waste heat of the exhaust gas is subsequently recovered by the regenerator 25, and this process results in the extremely good heat economy. Moreover, the air for combustion which has preheated by using the waste heat recovered in the regenerator 25 is supplied to the burner making the combustion. It is preferable to set the combustion cycle of the burners to a relatively short period of, for example, 20 to 90 seconds or 20 to 60 seconds, and the most preferred period is approximately 40 seconds when considering the improvement of the heat efficiency. If the period of about 40 seconds is adopted, the maximum regenerative efficiency can be obtained. The flows of the air for combustion and the exhaust gas are switched by using a (non-illustrated) timer or the like, or the switching operation with respect to these flows can be effected when the temperature of the combustion gas which has passed through the regenerator 25 is measured by a (non-illustrated) thermosensor and reaches a predetermined value. Such a sort time switching can be securely realized by the flow switching apparatus 1 of the present invention shown in FIGS. 1 to 4 without causing any exhaust gas leakage.

Figure 7:
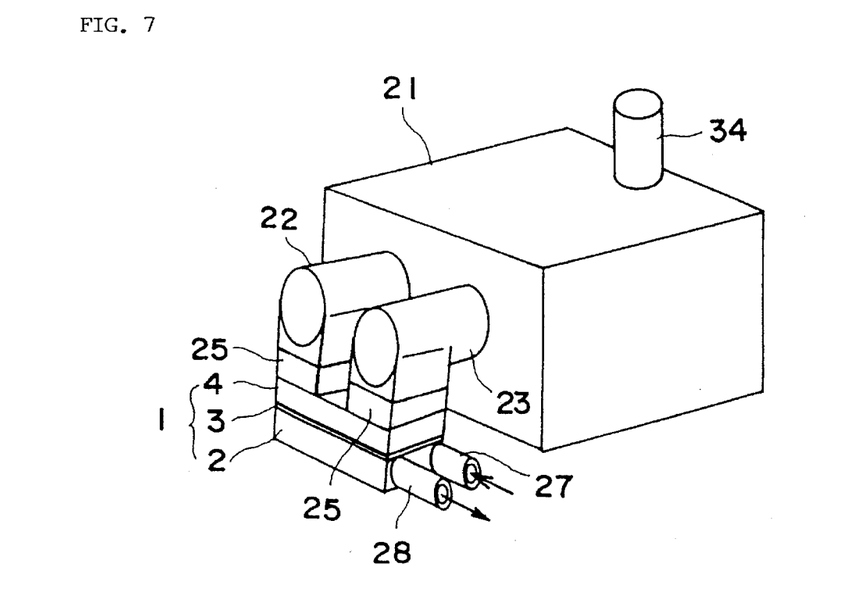
FIG. 7 is a perspective view showing another example of the regenerative alternate combustion system.

Although the flow switching apparatus 1 and the regenerative burners 22 and 23 are provided apart from each other in this embodiment, the apparatus 1 can be located just below the two burners 22 and 23 when these burners 22 and 23 are placed adjacent to each other as shown in FIG. 7. In such a case, the piping arrangement can be remarkably facilitated. The illustration of the fuel system is omitted in FIG. 7. The description has referred to the combination of a pair of regenerative burners and one flow switching apparatus in this embodiment, however, the present invention is not limited to this type of structure, and the switching of the air for combustion and the exhaust gas flowing to at least two pairs of regenerative burners may be performed by one flow switching apparatus.

Figure 6:
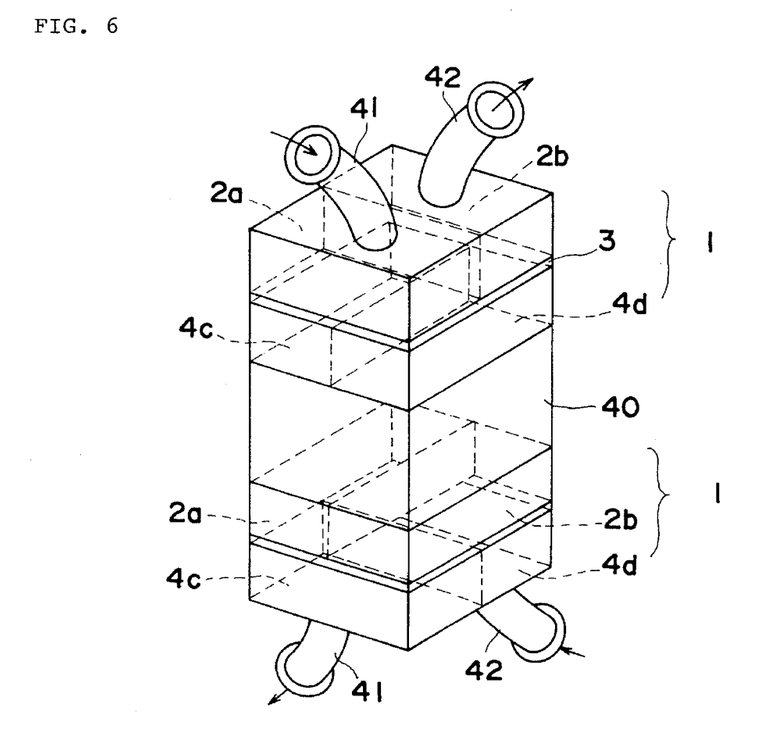
FIG. 6 is a schematic representation showing an example of a regenerative heat exchanger system to which a flow switching apparatus of the present invention is applied.

FIG. 6 shows an embodiment of a heat exchanger system using the flow switching apparatus of the present invention. In this embodiment, the flows of the fluid flowing therethrough are not basically changed and the switching is performed only at the portion where the heat exchange is effected. Each of two flow switching apparatuses shown in FIGS. 1 to 4 is provided to both the upstream and downstream sides of a regenerator 40. A first switching chamber 4c and a second switching chamber 4d of a switching chamber member 4 of the flow switching apparatus 1 on the upstream side are connected to the regenerator 40, while a first fixing chamber 2a and a second fixing chamber 2b of a fixing chamber member 2 of the flow switching apparatus 1 on the downstream side are connected to the regenerator 40 at positions opposed to the first and second switching chambers 4c and 4d on the upstream side. For example, an air supply pipe 41 is connected to one part of the fixing chamber member 2 and a flow 42 of the exhaust system is connected to the other part of the same 2 in the flow switching apparatus i on the upstream side. The first fixing chamber 2a and the second fixing chamber 2b of the fixing chamber member 2 in the flow switching apparatus 1 on the downstream side are positioned in correspondence to the first switching chamber 4c and the second switching chamber 4d of the switching chamber member 4. An air supply flow 41 for supplying the air for combustion preheated by the heat of the regenerator 40 to a boiler or the like is connected to the first chamber 4c of the switching chamber member 4 in the flow switching apparatus 1 on the downstream side, meanwhile a flow 42 of the exhaust system is connected to the second chamber 4d in order to exhaust the high temperature exhaust gas. With such an arrangement, it is preferable to use the sealant for sealing peripheral portions between each flow switching apparatus 1 and the regenerator 40. Since the regenerator 40 does not rotate, it is not difficult to seal portions between these members. It is also suitable to use the sealant to partition walls of the first and second switching chambers 4c and 4d of the upper flow switching apparatus 1 and the first and second fixing chambers 2a and 2b of the lower flow switching apparatus 1 at portions which are brought into contact with the regenerator 40.

In such a regenerative heat exchanger system, the fluid flows into an area different from the area where the fluid has flown in the regenerator 40 by changing over the flow in the upper flow switching apparatus 1 and the fluid again flows in the original flow by changing over the flow in the lower flow switching apparatus 1. Thus, the flows are switched only in the regenerator 40, and the gas can be continuously supplied without changing the flows at portions other than the regenerator 40.

Since the system has the above-described structure, the air supplied from the air supply pipe 41 is led to, for example, the first switching chamber 4c of the flow switching apparatus 1 and flows through the left half portion of the regenerator 40 to become the air having a relatively high temperature due to the heat of the regenerator 40. This air is further supplied to the fixing chamber 2a of the lower flow switching apparatus 1. Thereafter, the air is led from the first switching chamber 4c of the lower apparatus 1 to the air supply pipe 41 to supply the hot air. This hot air is used as the air for combustion or the like for, e.g., a boiler. The exhaust gas obtained by combustion is led to the second switching chamber 4d of the lower flow switching apparatus 1 through the flow 42 of the exhaust system and passes through the right half portion of the regenerator 40 via the second fixing chamber 2b of the same apparatus 1. The gas is then emitted from the flow 42 of the exhaust system through the second switching chamber 4d and the second fixing chamber 2b of the upper flow switching apparatus 1. In this process, the waste heat of the exhaust gas is recovered in the right half portion of the regenerator 40.

When the recovery of the waste heat has reached the saturated state, or when a predetermined switching time has come, the connections in the respective switching apparatuses 1 are switched by operating the switching means 3 each provided in the upper and lower flow switching apparatuses 1. Namely, the air supplied from the air supply pipe 41 is led from the first fixing chamber 2a of the upper flow switching apparatus 1 to the second chamber 4d of the switching chamber member 4. And after having passed through the right half portion of the regenerator 40, the air is fed to the second fixing chamber 2b of the lower flow switching apparatus 1 and further led to the first switching chamber 4c of the same apparatus 1 to be supplied to a boiler or the like from the air supply pipe 41. In this process, the air is preheated by the waste heat of the exhaust gas accumulated in the right half portion of the regenerator 40. On the other hand, the exhaust gas recovered from a boiler or the like is led to the second switching chamber 4d of the lower flow switching apparatus 1, then led to the first fixing chamber 2a of the same switching apparatus 1. After having passed through the left half portion of the regenerator 40 and having been heated, the gas is fed to tile first switching chamber 4c of the upper flow switching apparatus 1. Thereafter, the gas is supplied to the second fixing chamber 2b of the same apparatus 1 to be emitted to the atmospheric air or the like through the flow 42 of the exhaust system.

Though the description has been given with respect to specific preferred embodiments, the present invention is not restricted to only these forms and many variations and modifications will be possible within the scope of the invention. For example, the embodiments has been described on the assumption that each flow is connected to the first and second fixing chambers 2a and 2b of the fixing chamber member 2 and the first and second switching chambers 4c and 4d of the switching chamber member 4, but the present invention is not limited to this structure, and at least two flows may be connected to one chamber when the same kind of fluid flows in these flows. In other words, a plurality of flows can be used for one chamber if only the flows belong to the same system. Further, although the explanation has been given as to the case where the gas having a relatively high temperature and the gas having a relatively low temperature are used as the two systems of fluid, the present invention is not restricted to this case and may be applied to the apparatus that switches flows in which two systems of fluid having the thermal energy and ordinary temperature or two systems of fluid having the same temperature but materials different from each other flow. Furthermore, the embodiments use the air supply system and the exhaust system in which the fluid flows in directions opposed to each other as the two systems in which the flow directions of fluid are fixed, but the present invention may adopts two systems each having the fluid flowing in the same direction. In the regenerative alternate combustion burner system, the regenerator 25 may be connected directly to the first and second switching chambers 4c and 4d, or the first and second switching chambers 4c and 4d may accommodate the regenerator 25. These structures can be used in each embodiment shown in FIGS. 2 to 4. Moreover, the communicating holes 8bc, 8bd, 8ac, 8ad, 58ac, 58ad, 58bc, 58bd, 68ac, 68ad, 68bc, and 68bd are respectively constituted by a single circular hole in the first to fourth embodiments but these holes may have shapes other than a circle, for example, a square form, a triangular form or a group of multiple holes. A plurality of holes which will be opened or closed by one damper or a part of a disc are recognized as one hole.

What is claimed is:

1. A flow switching apparatus comprising: a casing which is partitioned by a partition wall into four chambers that are two fixing chambers connected to two systems of flow in which flow directions of fluid are fixed and two switching chambers connected to said two systems of flow in which the flow directions of fluid are alternately switched, and said casing being arranged in such a manner that said two switching chambers are respectively adjacent to each of said two fixing chambers; communicating holes formed in said partition wall to communicate each of said fixing chambers with said two switching chambers; and a switching means for opening and closing said communicating holes to connect one of the fixing chambers to one of the switching chambers and to connect the other fixing chamber to the other switching chamber, said flow switching apparatus being characterized in that said two fixing chambers are alternately connected to either of said two switching chambers respectively by said switching means.

2. The flow switching apparatus as set forth in claim 1 comprising: the casing including a fixing chamber member partitioned by the partition wall into said two fixing chambers connected to said two systems of flow in which the flow directions of fluid are fixed and a switching chamber member partitioned by the partition wall arranged orthogonal to said partition wall of said fixing chamber member into said two switching chambers connected to said two systems of flow in which the flow directions of fluid are alternately switched, said casing partitioning said fixing chamber member and said switching chamber member along the flows of fluid; the communicating holes which are formed in the partition wall provided in the flow direction of fluid in said casing and communicate one of said fixing chambers with said two switching chambers and the other fixing chamber with said two switching chambers at an area where said fixing and switching chambers overlap on each other; and the switching means for connecting one of the fixing chambers with one of said two switching chambers and the other fixing chamber with the other switching chamber by opening and closing said communicating holes.

3. The flow switching apparatus as set forth in claim 2, wherein said switching means is a butterfly type damper for alternately closing two communicating holes of the communicating holes at a time.

4. The flow switching apparatus as set forth in claim 2, wherein said switching means is a rotatable disc having through holes for alternately opening two communicating holes of the communicating holes at a time, the two communicating holes being at an interval of 180 degrees.

5. The flow switching apparatus as set forth in claim 1, wherein the partition wall is X-shaped for partitioning the casing into four chambers among which two opposed to each other are defined as the fixing chambers connected to said two systems of flow in which the flow directions of fluid are fixed while the remaining two opposed to each other are defined as the switching chambers connected to said two systems of flow in which the flow directions of fluid are alternately switched; the communicating holes for communicating said two chambers adjacent to said partition wall with each other; and the switching means which is provided at a position close to an intersection point of said partition wall and is constituted by dampers which are brought into contact with said partition wall to close said communicating holes, said flow switching apparatus being characterized in that said switching chambers to be connected to each of the fixing chambers can be switched by a swinging action of said switching means.

6. The flow switching apparatus as set forth in claim 1, wherein the partition wall comprises two Y-shaped walls so arranged as to be opposed to each other into said four chambers among which one of three chambers partitioned by one of said Y-shaped walls is further partitioned from the other Y-shaped wall; the communicating holes provided to said Y-shaped walls to communicate two adjacent chambers with each other among said four chambers, assuming said two chambers are defined as the fixing chambers connected to said two systems of flow in which the flow directions of fluid are fixed while the remaining two chambers are defined as the switching chambers connected to flows of said two systems in which the flow directions of fluid are alternately switched; and the switching means which is provided at a position close to an intersection point of said Y-shaped walls and is constituted by dampers which are brought into contact with said Y-shaped walls to block said communicating holes, said flow switching apparatus being characterized in that said switching chambers to be connected to each of the fixing chambers can be switched by a swinging action of said switching means.

7. A regenerative alternate combustion burner system, wherein an air system for combustion is connected to one of said two fixing chambers of said casing in said flow switching apparatus according to claim 1 while an exhaust gas system is connected to the other fixing chamber; wherein two regenerators and two combustion burners which are supplied alternately with air for combustion and emit combustion gas through said regenerators are connected to each of said two switching chambers of said casing; and wherein one of said burners alternately makes combustion gas by using the air for combustion supplied through said flow switching apparatus while the combustion gas supplied from the other of said burners where no combustion is made is emitted through said flow switching apparatus.

8. A regenerative heat exchanger system, wherein said flow switching apparatus according to claim 1 is provided on each of upstream and downstream sides of a regenerator; wherein the flow of fluid which has changed in said flow switching apparatus on the upstream side is recovered in said flow switching apparatus on the downstream side after having passed through said regenerator; and wherein the flow switching is performed in said regenerator.

* * * * *